US012600178B2

(12) United States Patent
Allinger et al.

(10) Patent No.: US 12,600,178 B2
(45) Date of Patent: Apr. 14, 2026

(54) TUBELESS TIRE INSERT

(71) Applicant: Fox Factory, Inc., Duluth, GA (US)

(72) Inventors: Wesley E. Allinger, Santa Cruz, CA (US); Paul Klawer, North Vancouver (CA); Douglas A. Chalmers, Burnaby (CA); Anastasiia Tekhteleva, Burnaby (CA)

(73) Assignee: Fox Factory, Inc., Duluth, GA (US)

( * ) Notice: Subject to any disclaimer, the term of this patent is extended or adjusted under 35 U.S.C. 154(b) by 371 days.

(21) Appl. No.: 17/174,227

(22) Filed: Feb. 11, 2021

(65) Prior Publication Data

US 2021/0252918 A1 Aug. 19, 2021

Related U.S. Application Data

(60) Provisional application No. 62/976,227, filed on Feb. 13, 2020.

(51) Int. Cl.
| | |
|---|---|
| *B60C 15/02* | (2006.01) |
| *B60C 5/00* | (2006.01) |
| *B60C 7/10* | (2006.01) |
| *B60C 7/24* | (2006.01) |
| *B60C 17/06* | (2006.01) |

(52) U.S. Cl.
CPC ........... *B60C 15/022* (2013.01); *B60C 7/105* (2013.01); *B60C 7/24* (2013.01); *B60C 17/065* (2013.01); *B60C 5/00* (2013.01); *B60C 2200/12* (2013.01)

(58) Field of Classification Search
CPC .... B60C 5/02; B60C 5/04; B60C 5/08; B60C 5/10; B60C 17/065; B60C 5/002; B60C 19/002; B60C 19/122; B60C 15/02; B60C 15/0209; B60C 17/01; B60C 17/02; B60C 19/12
See application file for complete search history.

(56) References Cited

U.S. PATENT DOCUMENTS

| | | | |
|---|---|---|---|
| 2018/0154688 A1 | 6/2018 | Teixeira | |
| 2018/0244105 A1 | 8/2018 | Kesteloo et al. | |
| 2018/0281531 A1 | 10/2018 | Parker | |
| 2019/0143763 A1 | 5/2019 | Krefting | |

FOREIGN PATENT DOCUMENTS

| | | | | |
|---|---|---|---|---|
| EP | 0290328 | * | 11/1988 | |
| EP | 2117850 | * | 4/2013 | |
| EP | 3566886 A1 | * | 11/2019 | ............ B60B 21/12 |
| EP | 3865316 B1 | | 5/2025 | |

(Continued)

OTHER PUBLICATIONS

Extended European Search Report for EP Application 21156988.4, dated May 31, 2021, 8 pages.

(Continued)

*Primary Examiner* — Justin R Fischer

(57) ABSTRACT

A system and method for a tubeless tire insert. The present invention includes an annular body having shock absorbing characteristics. A positioning system configured to vary a mean inner diameter of the insert is also included. The insert has a mean inner diameter X when the tire is being installed on the rim, and the insert has a mean inner diameter Y when the tire is installed on the rim, where X is greater than Y.

16 Claims, 4 Drawing Sheets

(56)     References Cited

FOREIGN PATENT DOCUMENTS

| | | | | |
|---|---|---|---|---|
| EP | 4592098 | A3 | | 10/2025 |
| FR | 3076487 | A1 | | 7/2019 |
| GB | 2571980 | A | | 9/2019 |
| JP | 60-201130 | | * | 10/1985 |
| JP | H03273912 | A | | 12/1991 |
| JP | H1159144 | A | | 3/1999 |
| JP | 2010-116091 | | * | 5/2010 |
| KR | 20190100721 | | * | 9/2019 |
| LU | 82351 | A1 | | 7/1980 |
| WO | WO 2010/128305 | | * | 11/2010 |

OTHER PUBLICATIONS

European Search Report for EP Application 25177434.5, dated Sep. 8, 2025, 11 Pages.

* cited by examiner

TUBELESS TIRE INSERT

CROSS-REFERENCE TO RELATED APPLICATIONS (PROVISIONAL)

This application claims priority to and benefit of U.S. Provisional Patent Application No. 62/976,277, filed on Feb. 13, 2020, entitled "TUBELESS TIRE INSERT" by Allinger et al., and assigned to the assignee of the present application, the disclosure of which is hereby incorporated by reference in its entirety.

FIELD OF THE INVENTION

The present disclosure generally relates to an insert for a tubeless vehicle tire.

BACKGROUND OF THE INVENTION

Tubeless vehicle tires are notoriously hard to initially pressurize. The process often involves the installation of the tubeless tire onto the rim and then a cargo strap, an injected gas that can be lit, a large air compressor with the ability to push a large volume of air, or the like, to initially cause the tubeless tire to form a seal with the rim. As such, putting a tubeless tire in use will also cause the user to carry the proper equipment to reseal the tire if the tire bead is separated from the rim due to loss of pressure as a result of tire damage (e.g., via a rock, a dent, a poke, etc.). In an automobile, such as an off-road truck, there is cargo space, available extra power and room to carry heavy straps, air-compressors, and the like. However, in smaller vehicles such as motorcycles, bicycles, ATV's and the like, there is often not the space or weight bearing ability to carry the required tools. As such, the advantages of using tubeless tires is lost on these smaller vehicles.

SUMMARY

Embodiments of the present invention pertain to a system and method for a tubeless tire insert. In one embodiment, the present invention includes an annular body having shock absorbing characteristics. A positioning system configured to vary a mean inner diameter of the insert is also included. The insert has a mean inner diameter X when the tire is being installed on the rim, and the insert has a mean inner diameter Y when the tire is installed on the rim, where X is greater than Y.

BRIEF DESCRIPTION OF THE DRAWINGS

The drawings referred to in this description should be understood as not being drawn to scale except if specifically noted. Common reference numerals are used throughout the drawings and the detailed description to indicate the same elements.

DESCRIPTION OF EMBODIMENTS

Figure 1:
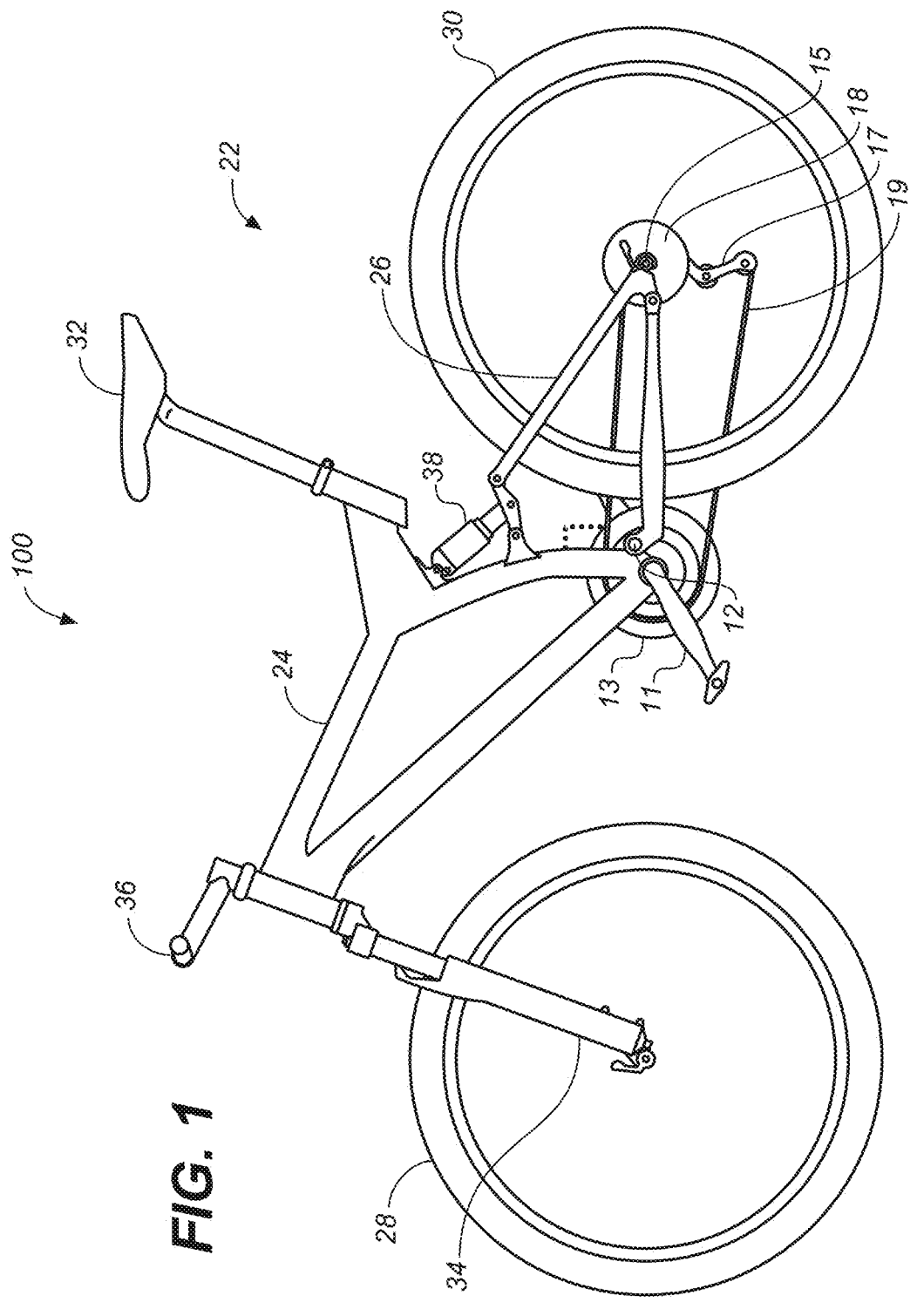
FIG. 1 is a perspective view of a bicycle having a front and rear wheel one or both of which have an insert therein, in accordance with an embodiment.

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.
Overview Inserts are used in tubeless pneumatic tires to prevent damage to the tire and rim that may occur while riding and to provide a user with improved riding performance if the tire loses pressure due to a puncture or a cut. Such inserts can significantly hinder the installation of the tires on the rim. One of the problem a user faces during the installation of the tire on the rim, with a conventional insert, is that when a first tire bead has been inserted in a bead well of the rim, and the insert has been placed on the rim, the insert obstructs the bead well and it becomes incredibly difficult to insert a second tire bead into the bead well and thereby to position the second tire bead onto the rim bed between the sidewalls of the rim.

Such an installation often requires the user to apply considerable efforts and use specific tools to install the second tire bead between the rim sidewalls, thereby increasing the assemblage time and also the risk of tire and/or rim damage. Moreover, the above described installation procedures reduce the overall convenience of the user from riding a cycled vehicle, especially, when the need to reinstall the tire occurs at an off-road site, where the user may not have proper tools or enough time to perform the installation.

The solution revealed herein provides an insert that provides anti-puncture and rim impact protection, allows for installation of the tire on the rim in a more convenient manner, and has sufficient shock absorbing and tire bead retaining characteristics if the rider would need to ride on an otherwise under inflated or flat tire. In one embodiment, the insert provides a new and novel method of sealing the beads of the tubeless tire with the rim without the need for straps, air compressors, or other tools or devices that are normally a required part of mounting a tubeless tire to a rim. In general, the insert is installed within an internal fluid chamber of a tubeless tire at a first larger mean inner diameter. After the tubeless tire is mounted on the rim, the mean inner diameter of the insert is reduced to a second smaller mean inner diameter allowing the insert to press into the rim bed. As the insert is pressed into the rim bed, it exerts a force on the beads of the tubeless tire. This force causes the beads of the tubeless tire to form a seal with the rim bed. This force may result in displacement on the tire beads from their initial installed positions to new positions on the rim bed that are at a larger mean diameter than the initial position. Once the seal is formed, the tire can be fully seated and inflated with minimal or no leakage. In one embodiment, bead locks can be additionally used for facilitating of coupling the tire beads to the rim bed.

It should be pointed out that, for purposes of the present application, measurements such as, for example, a diameter may be referred to as a mean diameter. It will be understood that slight variations in the diameter may exist, for example, for the insert at various radial locations of the insert. Hence, for purposes of clarity and accuracy, the present application will refer to a mean diameter. It should be understood that terms such as "a mean diameter X", "a mean diameter Y" and the like are not intended to indicate that the diameter has an exact value of "X" or "Y". Instead, it should be understood that slight variations may occur from the mean or typical diameter recited.

Operation

Referring now to FIG. 1, a perspective view of a bicycle having a front and rear wheel one or both of which have an insert therein is shown in accordance with an embodiment. Bicycle 100 has a frame 24 with a suspension system comprising a swing arm portion 26 that, in use, is able to move relative to the rest of frame 24; this movement is permitted by, inter alia, a rear shock absorber and/or damping assembly 38. The front forks 34 also provide a suspension function via a damping assembly in at least one fork leg; as such the bicycle 100 is a full suspension bicycle (such as an ATB or mountain bike).

In one embodiment, swing arm portion 26 is pivotally attached to the main frame 24 at pivot point 12 which is located above the bottom bracket axis 11. Although pivot point 12 is shown in a specific location, it should be appreciated that pivot point 12 can be found at different distances from bottom bracket axis 11 depending upon the rear suspension configuration. The use of the specific pivot point 12 herein is provided merely for purposes of clarity. Bottom bracket axis 11 is the center of the pedal and front sprocket assembly 13. Bicycle 100 includes a front wheel 28 which is coupled to the main frame 24 via front fork 34 and a rear wheel 30 which is coupled to the main frame 24 via swing arm portion 26. A seat 32 is connected to the main frame 24 in order to support a rider of the bicycle 20.

The front wheel 28 is supported by a front fork 34 which, in turn, is secured to the main frame 24 by a handlebar assembly 36. The rear wheel 30 is connected to the swing arm portion 26 of the frame 22 at rear axle 15. A shock absorber (e.g., damper assembly 38) is positioned between the swing arm portion 26 and the frame 22 to provide resistance to the pivoting motion of the swing arm portion 26 about pivot point 12. Thus, the illustrated bicycle 100 includes a suspension member between swing arm portion 26 and the frame 24 which operate to substantially reduce rear wheel 30 impact forces from being transmitted to the rider of the bicycle 100.

Bicycle 100 is driven by a chain 19 that is coupled with both front sprocket assembly 13 and rear sprocket 18. As the rider pedals the front sprocket assembly 13 is rotated about bottom bracket axis 11 a force is applied to chain 19 which transfers the energy to rear sprocket 18. Optional chain tension device 17 provides a variable amount of tension on chain 19. The need for chain 19 length variation can be due to a number of different gears that may be on one or both of front sprocket assembly 13 and/or rear sprocket 18 and/or changes in chain stay length as the distance between bottom bracket axis 11 (where front sprocket assembly 13 attaches to bicycle frame 24) and the rear axle 15 changes due to suspension articulation as shown in further detail in herein.

Although FIG. 1 is a full suspension bicycle, the embodiments described herein are not limited to use on full suspension bicycles. They can be utilized on any vehicle having a tubeless tire such as, but not limited to, a unicycle, bicycle, tricycle, motorcycle, 4-wheeled vehicle, a car, and the like.

Figure 2:
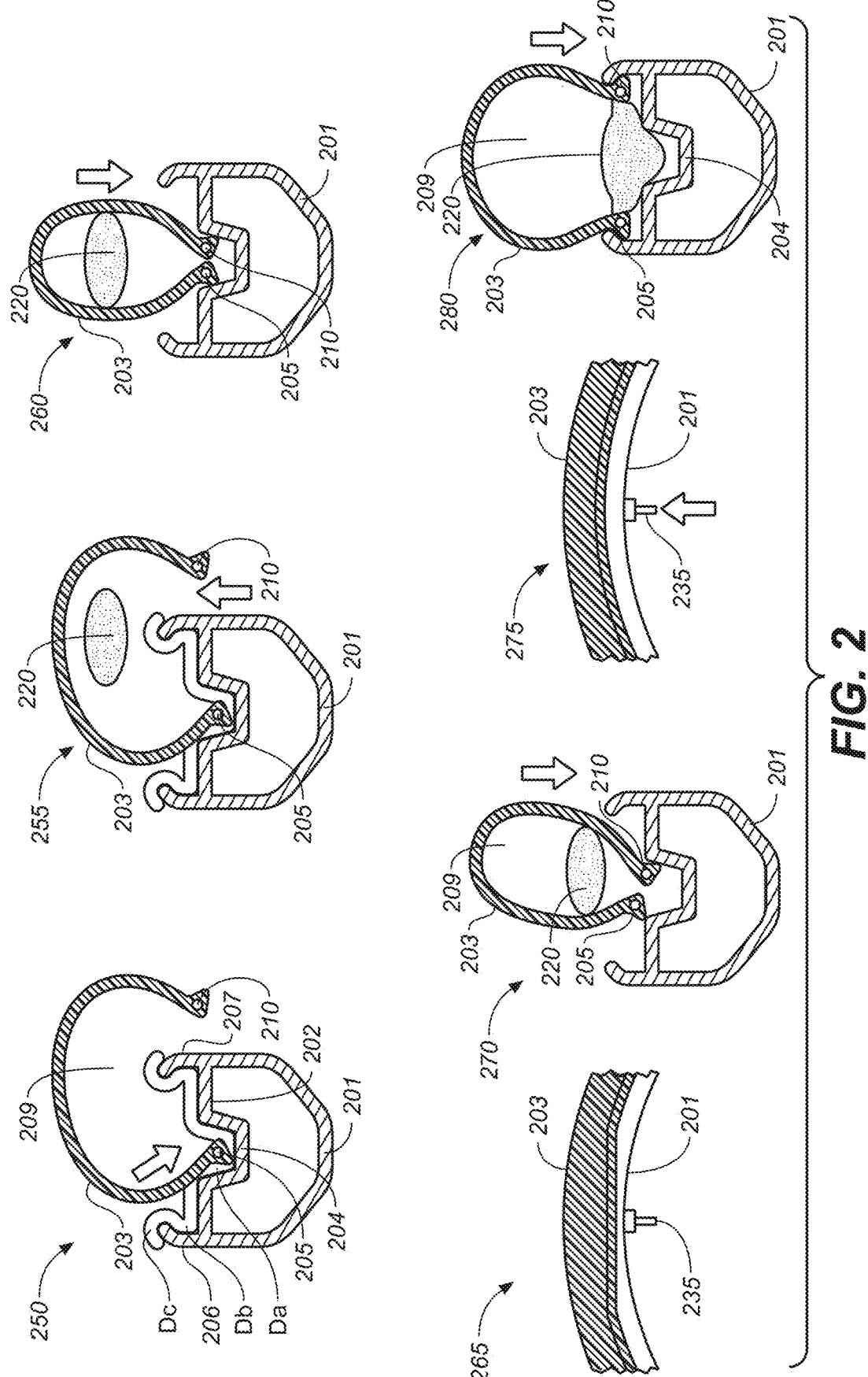
FIG. 2 is a cross-sectional view of at least one wheel of FIG. 1 shown in a number of steps of a process of installing an insert into a tire and installing the tire onto a rim, in accordance with an embodiment.

Referring now to FIG. 2, a number of cross-sectional views (250-280) of front wheel 28 (or similarly rear wheel 30 of FIG. 1) are shown. The different cross-sectional views include one or more embodiments of a process of installing an insert 220 into tubeless tire 203 and installing tubeless tire 203 onto the wheel rim 201. In one embodiment, wheel rim 201 includes a rim bed 202 having a first sidewall 206, a second sidewall 207, and a base portion extending therebetween. In one embodiment, the base portion further comprises a central channel or recess called a bead well 204. A depth of the bead well 204 varies for different embodiments of the wheel rim 201. In one embodiment the base portion of the rim bed 202 further comprises protrusions defining bead seats. In one embodiment, sidewalls 206, 207 of the rim bed 202 further comprise hooks to further retain the beads. In other words, with the basic structural features of the front wheel 28 described above, the following is one embodiment for installing insert 220 and tubeless tire 203 onto rim 201 of wheel 28. Although a number of cross-sectional views are shown, it should be appreciated that there may be more, fewer, or different ways of performing the installation of insert 220 and tubeless tire 203 onto the wheel rim 201.

In one embodiment, the insert 220 is a non-inflatable component formed from any of the following materials or combinations thereof: a foam material, a resilient material, a multi-cellular butyl material, a polymer material, a composite material, a multi-layered material, a shape memory material, a multi-layered material having at least one layer comprising a shape memory material, or the like, and/or at least a part of the insert is formed from a shape memory material. In general, the insert 220 provides an amount of run-flat type of performance. For example, if the tire is underinflated or flat, the insert 220 will keep the tire mounted on the rim if the rider continues to ride the bike with an underinflated or flat tire. In addition, insert 220 will also provide an amount of impact absorption between the rim 201 and tire 203 that will provide an amount of protection for the rim 201 and tire 203 when forces are applied to them by the external terrain.

At 250 of FIG. 2, prior to installation of insert 220, the first side of tubeless tire 203 including bead 205 is installed onto the rim bed 202 between the rim sidewalls 206, 207 about rim 201. This is achieved by locating the majority of the tire bead 205 within a smaller mean diameter $D_a$ of the bead well 204. This permits the remaining portion of tire bead 205 to pass over a larger mean diameter $D_c$ of the first rim sidewall 206. A mean inner diameter of the tire beads 205 and 210 is substantially sized to seal around the mean diameter $D_b$ of the rim bed 202. This half installation of tubeless tire 203 begins forming the internal fluid chamber 209 of tubeless tire 203. Tubeless tire 203 includes a pair of tire sidewalls and a tire end wall extending between the pair of tire sidewalls. Each tire sidewall includes an outer surface and an opposing inner surface. The sidewalls extend away from the tire end wall and terminate in respective first bead 205 and second bead 210. In general, first bead 205 and second bead 210 are to be received against respective sidewalls 206, 207 of the rim bed 202 to interconnect the tubeless tire 203 to the wheel rim 201. The tire end wall also includes an inner surface and an outer surface, with the outer surface preferably having traction or gripping elements formed therein. The tubeless tire 203 may be formed of rubber or other suitable materials known by those skilled in the art.

At 255 of FIG. 2, after the first side of tubeless tire 203 is installed about rim 201, insert 220 is introduced into the partially formed internal fluid chamber 209 of tubeless tire 203 about the entire circumference of the rim 201 through the opening between rim 201 and the far side of tubeless tire 203 that includes bead 210. The overall size of the internal fluid chamber 209 of tubeless tire 203 is larger than the size of insert 220, which facilitates installation thereof. At this point, insert 220 does not necessarily need to be located near the rim bed 202 or tire beads 205, 210, but instead is able to be placed anywhere within the partially formed internal fluid chamber 209 of tubeless tire 203. As such, the insert can be at a larger inner diameter than $D_b$ of the rim bed 202. At this point, insert 220 has a mean inner diameter X.

At 260 and 265 of FIG. 2, in one embodiment, once insert 220 is installed into the partially formed internal fluid chamber 209 of tubeless tire 203, e.g., between the rim 201 and the tubeless tire 203, the second side of tubeless tire 203 that includes bead 210 is installed onto rim bed 202. At this point, the bead well 204 in rim bed 202 is not obstructed by insert 220 and a user can place second bead 210 into bead well 204 without any interference by insert 220. This permits installation of the second bead 210 between the rim sidewalls 206, 207 in the same method as described for the first bead 205.

In one embodiment, the insertion of the second side of tubeless tire 203 will require the use of a tool such as a tire lever, screwdriver, credit card, or the like to lever the second side of tubeless tire 203 over the rim sidewall 207 onto the rim bed 202 of rim 201.

At 270 of FIG. 2, the mean inner diameter of insert 220 is being reduced. In one embodiment, once the first bead 205 and second bead 210 are mounted between the sidewalls 206, 207 of rim bed 202, the inner surface of tubeless tire 203 and rim bed 202 defines an internal fluid chamber 209. In one embodiment, the internal fluid chamber is in fluid communication with a valve (such as valve 235 of FIG. 2) which allows for selective inflation/deflation of the internal fluid chamber 209.

In one embodiment, the valve includes a conventional valve stem which is capable of extending through the wheel rim 201 when the tubeless tire 203 is installed on the wheel rim 14. The valve is further adapted to be engaged with an air pump, or other pressurized fluid source for inflating the internal fluid chamber of tubeless tire 203. In this respect, it is understood that the internal fluid chamber 209 of tubeless tire 203 may be filled with air, nitrogen, carbon dioxide, or the like. In one embodiment, the valve may be fluidly coupled to a pressure sensor and/or display gauge to monitor and display the pressure within the internal fluid chamber of tubeless tire 203. In one embodiment, the valve includes features that create an unobstructed flow path even when subjected to any radial obstruction that insert 220 may present.

At 275 of FIG. 2, once both bead 205 and bead 210 of tubeless tire 203 are within rim sidewalls 206, 207 of rim bed 202, valve 235 provides the ability to begin to increase the pressure in the internal fluid chamber 209 of the tubeless tire 203. In one embodiment the internal fluid chamber 209 of tubeless tire 203 begins to be inflated after the valve 235 is connected to a pressurized fluid source.

In one embodiment, the insert 220 is installed within the internal fluid chamber of tubeless tire 203 and is designed to at least partially fill the rim bed 202 and bead well 204 of rim

201 to mitigate the likelihood of breaking the coupling between beads 205, 210 and the rim sidewalls 206, 207.

In one embodiment, insert 220 is formed in a shape that corresponds to rim bed 202. In one embodiment, insert 220 is formed in a pliable shape that will correspond to universal rim bed shape.

At 280 of FIG. 2, in one embodiment, as the mean inner diameter X of insert 220 is reduced to the mean inner diameter Y, and insert 220 is tightened against rim bed 202, it also imparts a force on the inside of both bead 205 and bead 210 which causes both bead 205 and bead 210 to move outward from $D_a$ of bead well 204 to larger $D_b$ of rim bed 202. As the insert 220 assumes a tight, complimentary fit against rim bed 202, bead 205 and bead 210 are forced out of bead well 204 onto larger diameter sections of rim bed 202. Once bead 205 and bead 210 are sealed tightly against rim bed 202, a coupling is formed between rim 201 and tubeless tire 203. After the coupling is formed, the pressure within internal fluid chamber 209 can be increased or continue to be increased until the beads 205 and 210 are seated against sidewalls 206, 207 of rim bed 202, the pressure can then be either increased or decreased within the internal fluid chamber for use in the desired application.

In one embodiment, an optional step of externally applying a force to the end wall of tubeless tire 203 and correspondingly to insert 220 (such as shown in FIG. 2) can be used to position insert 220 against rim bed 202 of rim 201.

It is to be appreciated that specific dimensions, proportions, shapes and configurations of each of the tubeless tire 203, insert 220, rim bed 202, bead well 204, sidewalls 206, 207 and internal fluid chamber 209 are shown in accordance with one embodiment. However, it should be appreciated that any or all of the described components could be of any suitable shape, such as oval, square, rectangular, triangular, or the like.

Adjusting the Size of the Insert

Figure 3:
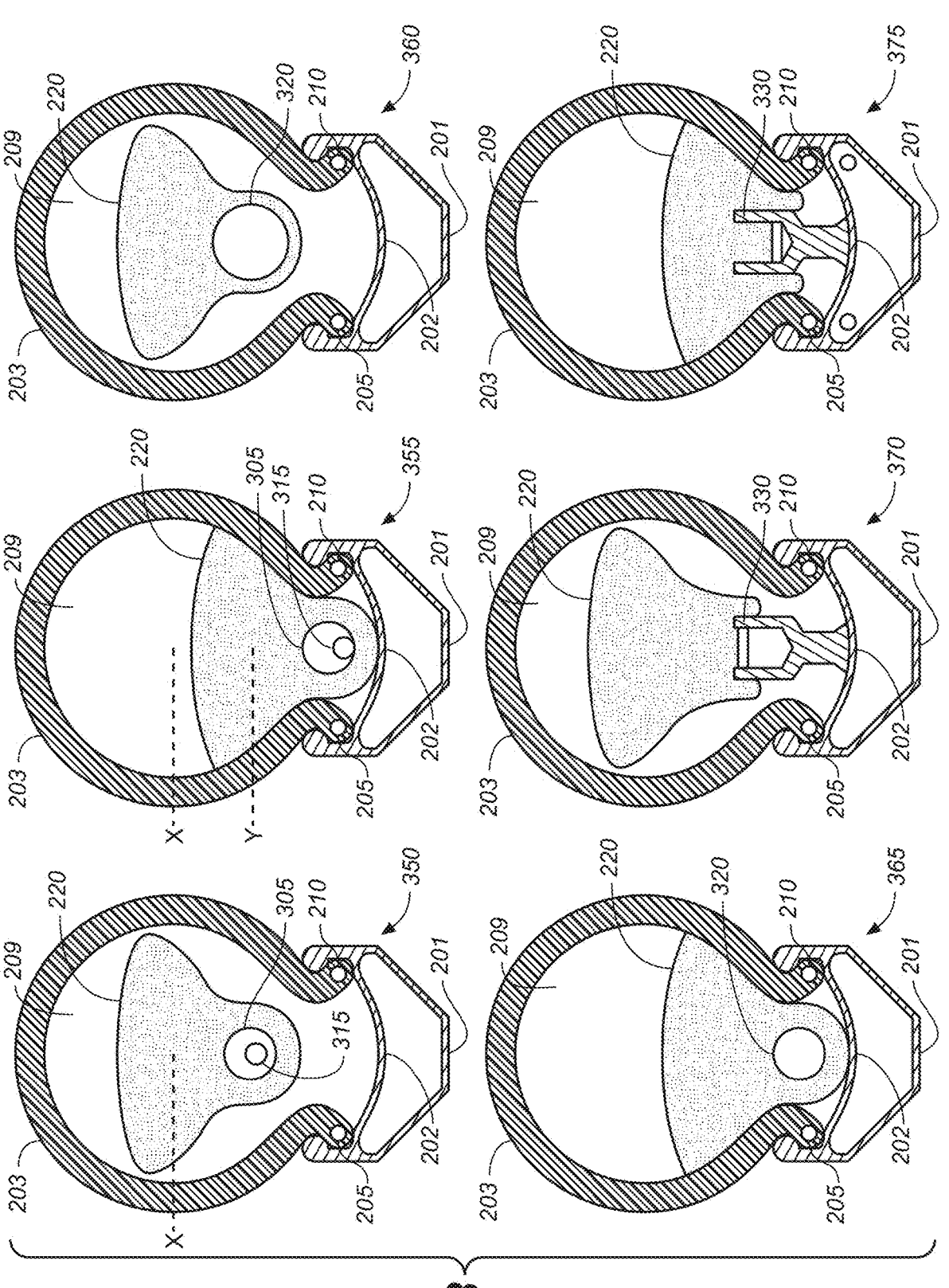
FIG. 3 is a cross-sectional view of at least one wheel of FIG. 1 shown in a number of steps of a process of installing an insert into a tire and installing the tire onto a rim, in accordance with an embodiment.

Referring now to FIG. 3, a number of cross-sectional views (350-375) of front wheel 28 (or similarly rear wheel 30 of FIG. 1) are shown. The different cross-sectional views include a number of configurations for installing insert 220 into tubeless tire 203 and installing tubeless tire 203 onto the wheel rim 201. In one embodiment, tubeless tire 203 includes a first bead 205 on a first side of the tubeless tire 203, and a second bead 210 on the opposite side of the tubeless tire 203. In one embodiment, wheel rim 201 includes a rim bed 202 having a first sidewall 206, a second sidewall 207, and a base portion extending therebetween. In one embodiment, the base portion further comprises a central channel or recess called a bead well 204. A depth of the bead well 204 varies for different embodiments of the wheel rim 201. In one embodiment the base portion of the rim bed 202 further comprises protrusions defining bead seats. In one embodiment, the sidewalls 206, 207 of the rim bed 202 further comprise hooks to further retain the beads.

With reference now to 350 of FIG. 3, in one embodiment, insert 220 comprising an annular body and a positioning system is designed to be carried within a pneumatic tire casing (e.g., tubeless tire 203) mounted on wheel rim 201. In one embodiment, positioning system 315 is used to vary a mean inner diameter of insert 220. For example, as shown at 350 in FIG. 3, insert 220 has the mean inner diameter X when the tubeless tire 203 is being installed on rim 201. At 355 of FIG. 3, insert 220 has the mean inner diameter Y when the tubeless tire 203 is installed on rim 201, where X is greater than Y.

In one embodiment, (as shown in cross-sectional views 350-365), insert 220 includes an annular cavity 305 fully enclosed within insert 220. This cavity 305 could be positioned in such a manner as to not compromise the performance of insert 220 in its protective and shock absorbing functions, but in such a manner that the positioning system 315 will be able to influence the mean inner diameter of insert 220.

In one embodiment, positioning system 315 can be located within the insert 220, for example, it can be located in the cavity 305, or it can be externally fixed to insert 220, or it can be placed in the insert 220 in any other appropriate manner. The positioning system 315 can be a wire, a chain, a helical structure, a cord or cable comprising metal, a metal alloy, a polymer material, a shape memory material such as a shape memory alloy or shape memory polymer, or any other acceptable material or combinations thereof, and/or at least a part of the positioning system 315 can comprise the shape memory material.

For example, in 350 of FIG. 3 in one embodiment, the insert 220 having a mean inner diameter of X includes the cable as positioning system 315. In 355 of FIG. 3, one embodiment shows insert 220 after the positioning system 315 is utilized to reduce the insert 220 to a mean inner diameter of Y.

In one embodiment, the positioning system 315 includes an adjusting device, such as a spool or a cord lock, a rotating bolt, or any other suitable device, which allows the user to adjust the positioning system 315 and thereby force the insert 220 to contract and reduce its mean inner diameter. In general, one or more systems, such as handles, stoppers, ratchets, nuts, and others, which facilitate adjusting the positioning system 315 and reducing the mean inner diameter of the insert 220 could be included in the positioning system. In one embodiment, the positioning system 315 may be externally adjustable by the user. In one embodiment, the positioning system 315 may be irreversibly adjusted once the tubeless tire 203 is mounted on rim 201.

In one embodiment, positioning system deviates around a valve (such as valve 235 of FIG. 2) to pressurize fluid chamber 209 of the tubeless tire 203 without obstruction of a fluid flow, when the tubeless tire 203 is mounted on the rim 201.

In one embodiment, when the insert is installed on the rim 201, the insert comes into contact with the base portion of the rim bed 202 or the bead well 204.

In one embodiment, there is a clearance between the base portion of the rim bed 202 (or the recess 204 of the rim bed) and the insert 220 installed on the rim. The clearance prevents obstruction of a fluid flow through a valve by the insert when the tubeless tire is being pressurized.

In one embodiment, the insert 220 or a portion therein, can be linearly expanded or contracted by applying corresponding temperatures.

In one embodiment, the positioning system comprises a shape memory polymer or alloy, or at least a part of the positioning system comprises the shape memory polymer or alloy. In one embodiment, the shape memory actuated positioning system is a helical structure, or a wire-like structure, or a cable-like structure, or a sheet like structure, which extends along the insert. In one embodiment, the shape memory actuated positioning system is located in the cavity, or it is externally fixed to insert 220, or it is placed in the insert 220 in any other appropriate manner.

The shape memory positioning system can also be implemented in a variety of shapes. In one embodiment, the shape memory activated positioning system is a stand-off element.

The shape memory actuated positioning system is actuated to change the mean inner diameter of the insert 220 by applying external heating or electric resistive heating, or applying a magnetic field to the system. In one embodiment, electrical connection for actuating the shape memory positioning system is integrated with the air valve to connect to an external power supply. In another embodiment, electrical connection is provided as a dedicated or stand-alone system.

In general, insert 220 or at least a part of the insert 220 can have a continuous structure, an integral structure, a solid structure, a layered structure, a composite structure, a segmented structure, or any combinations thereof. The insert 220 or at least a part of the insert 220 can be made in various shapes, such as oval, square, rectangular, triangular, or the like. The insert 220 or at least a part of the insert 220 can be made in a shape that complies with a shape of the rim bed 202 or with a shape of a portion of the rim bed 202. The insert 220 or at least a part of the insert 220 can be corrugated, or the like. In general, insert 220 or at least a part of the insert 220 can comprise or can be made of foam or another material that can be compressible, expandable, extendable, resilient, or the like, a multi-cellular butyl material, a cellular cushioning material comprising void cells, a polymer material, a composite material, a multi-layered material, a shape memory material, a multi-layered material having at least one layer comprising the shape memory material, or the like, or any combinations thereof.

In one embodiment, the insert 220 has a continuous structure at any point of a cross-section of the insert excluding the area around a valve. In one embodiment, the insert 220 has a continuous structure at any point of a cross-section of the insert.

In one embodiment, the insert 220 comprises at least one part and/or at least one layer made of a material different from a material or materials used in the rest of the insert 220. In one embodiment, the insert 220 comprises a plurality of parts and/or layers comprising different materials. In one embodiment, the insert comprises at least two parts comprising the same material.

In one embodiment, the insert or at least a part of the insert comprises a cellular cushioning material having void cells. In one embodiment, at least a part of the insert comprises a material having deformable and/or deflectable features.

With reference now to cross-sections 360 and 365 of FIG. 3, in one embodiment, positioning system 320 can be a pneumatic structure or a pneumatic system capable of providing directional biased expansion of insert 220. For example, cross-section 360 of FIG. 3 shows insert 220 having a first mean inner diameter and pneumatic positioning system 320. Position 365 of FIG. 3 shows the insert having a second mean inner diameter that is smaller than the first mean inner diameter and the pneumatic positioning system 320.

With reference now to cross-sections 370 and 375 of FIG. 3, the change to the mean inner diameter of the insert 220 is achieved with use of a standoff pneumatic positioning system 330 having a static and dynamic portion, whereby the static portion is rigid, and the dynamic portion is somewhat flexible and may be able to translate with respect to the static portion. The dynamic portion may also be flexible in nature. For example, the structure of pneumatic positioning system 330 can be selectively inflatable and can be configured to connect with a valve for the inflation or deflation thereof. This valve may be integrated into the existing valve system (valve 235 of FIG. 2) used to inflate the tubeless tire 203 in the conventional system, or may be a dedicated or stand-alone system. In one embodiment, when the positioning system is the standoff pneumatic positioning system 330, the system includes a piston. In one embodiment, when the insert has the mean inner diameter X, the standoff pneumatic positioning system 330 is inflated. To reduce the mean inner diameter of the insert to the mean inner diameter Y, the standoff pneumatic positioning system 330 is deflated.

In general, the standoff pneumatic positioning system 330 can be integrally formed with the insert or it can be provided as a separate part. In one embodiment, the insert is configured to accommodate at least a part of the standoff pneumatic positioning system 330. In one embodiment, the standoff pneumatic positioning system 330 is sealed at the end which is in contact with the insert.

Figure 4:
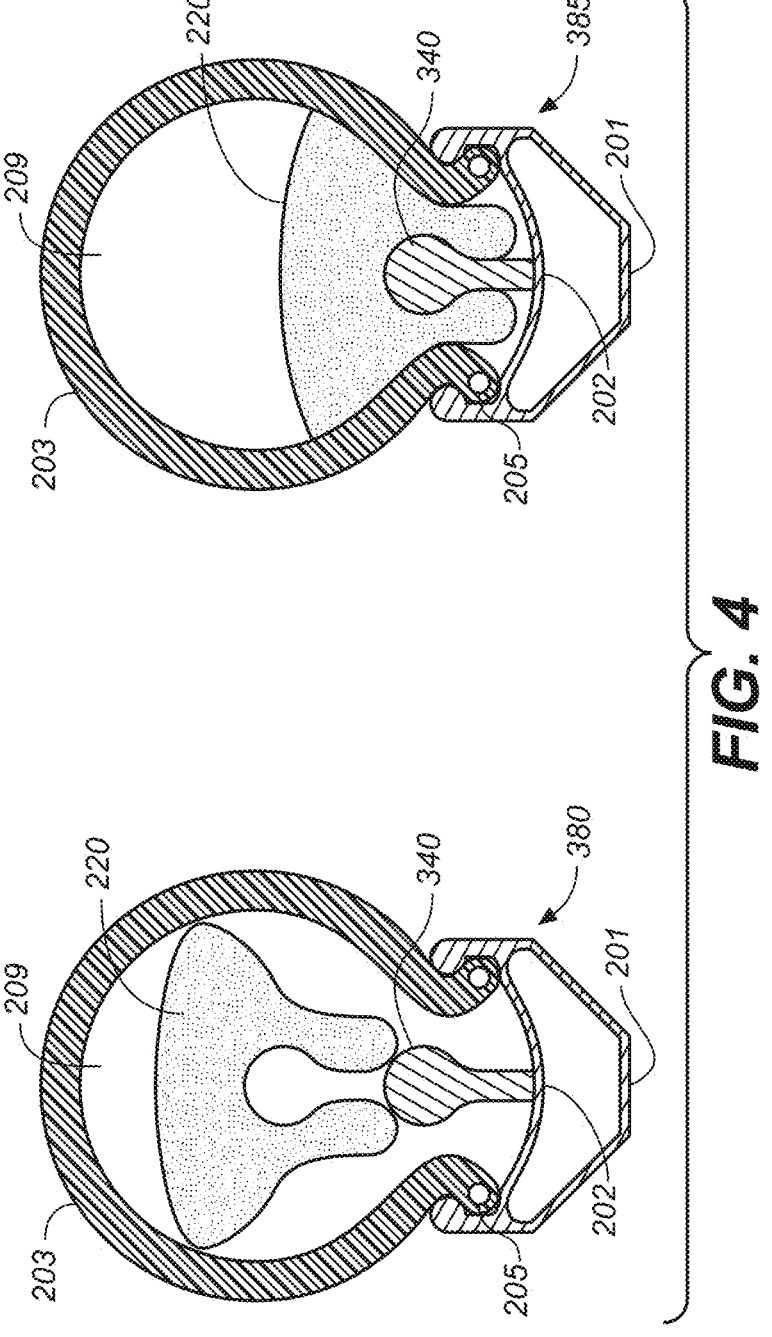
FIG. 4 is a cross-sectional view of at least one wheel of FIG. 1 shown in a number of steps of a process of installing an insert into a tire and installing the tire onto a rim, in accordance with an embodiment.

With reference to FIG. 4, in one embodiment, the positioning system is a stand-off element 340. The stand-off element 340 can be centered or off-centered relative to the center of insert 220. In one embodiment, the stand-off element interacts with insert 220 in a bistable nature, where in one state insert 220 has a larger inner diameter of X, and in the other state has smaller inner diameter Y. In one embodiment, insert 220 is positioned in a bistable nature from inner diameter X to inner diameter Y by applying an external force through tubeless tire 203 onto insert 220. In one embodiment, as shown in the comparison of cross-sections 380 and 385 at least a portion of the stand-off element can be accommodated within the insert 220.

In one embodiment, stand-off element 340 is connected to insert 220. In one embodiment, stand-off element 340 extends along insert 220.

In one embodiment, stand-off element 340 can be provided at the surface of rim bed 202 and be directed towards the insert 220. In one embodiment, stand-off element 340 is integrated into rim bed 202. In one embodiment, stand-off element 340 extends along rim bed 202.

In one embodiment, stand-off element 340 is provided as a separate part. In one embodiment, stand-off element 340 is a stem-like structure, or the like. In one embodiment, stand-off element comprises at least two parts. In one embodiment, said at least two parts are movable with respect to each other. In one embodiment, said at least two parts are connected to each other. In one embodiment, said at least two parts comprise a part that is retractable into another part. In one embodiment, at least one part of the stand-off element is accommodated in the insert 220. In one embodiment, the stand-off element 340 comprises deformable and/or deflectable features.

In general, it should be appreciated that any or all of the described positioning systems, or at least a part of any or all of the described positioning systems could have any suitable structures, such as continuous, integral, segmented, solid, composite, layered, or any combinations thereof.

In general, it should be appreciated that any or all of the described positioning systems, or at least a part of any or all of the described positioning systems could be of any shapes, such as oval, square, rectangular, triangular, helical, spherical, cylinder, conical, pyramid, or the like.

In general, it should be appreciated that any or all of the described positioning systems, or at least a part of any or all of the described positioning systems could comprise any suitable materials, such as polymers, metals, metal alloys, shape memory materials, composite materials, or the like.

In one embodiment, to remove the tubeless tire 203 and/or the insert 220, positioning system is adjusted (e.g., released, loosened, depressurized, pressurized, heated, or the like), and valve 235 is opened, which allows the pressurized fluid to be exhausted from the internal fluid chamber 209. The adjustment of positioning system causes insert 220 to reduce the pressure exerted on bead 205 and bead 210, which facilitates removing of the tubeless tire and/or the insert from the rim. In one embodiment, the adjustment of positioning system 315 causes insert 220 to expand from the mean inner diameter Y back to the larger mean inner diameter X. In one embodiment, when the mean inner diameter of insert 220 is increased, insert 220 will move away from rim bed 202 of rim 201.

It is to be appreciated that specific dimensions, proportions, shapes and configurations of each of the tubeless tire 203, insert 220, rim bed 202, and internal fluid chamber 209 are shown in accordance with one embodiment. However, it should be appreciated that any or all of the described components, or at least a part of any or all of the described components, could be of any suitable shape, such as oval, square, rectangular, triangular, or the like.

Furthermore, although the foregoing describes insert 220 and tubeless tire 203 in the context of bike 100 and wheel 28. It should be appreciated that in one embodiment, the insert 220 and tubeless tire 203 may be particularly adapted for use in road bicycles, off-road bicycles, motorcycles, other on-road wheeled vehicles, other off-road wheeled vehicles, and the like.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended Claims is not necessarily limited to the specific features or acts described above. Rather, the specific features and acts described above are disclosed by way of illustration and as example forms of implementing the Claims and their equivalents.

What is claimed is:

1. A tubeless tire insert for use in installing a tubeless vehicle tire on a rim, said tubeless tire insert comprises:

an annular body, said annular body comprising a shape memory material which can be actuated, a positioning system configured to vary a mean inner diameter of said tubeless tire insert, wherein said tubeless tire insert has a mean inner diameter X when said tubeless vehicle tire is being installed on said rim; and said tubeless tire insert has a mean inner diameter Y when said tubeless vehicle tire insert is installed on said rim, where X is greater than Y, said tubeless tire insert to press into a rim bed of said rim, said tubeless tire insert exerting a force on a first bead and a second bead of said tubeless vehicle tire, said force causing said first bead and said second bead to displace said first bead and said second bead from said respective initial installed positions to new positions on said rim bed, said new positions at a larger mean diameter than said initial installed positions, said tubeless tire insert creating a coupling between said rim and said tubeless vehicle tire.

2. The tubeless tire insert of claim 1, wherein said tubeless tire insert has a structure selected from the group consisting of: a continuous structure at any point of a cross-section of said tubeless tire insert, at least one portion made of a second material different from a first material comprising the rest of said tubeless tire insert, a plurality of portions comprising different materials, and a plurality of portions of the same material.

3. The tubeless tire insert of claim 1, wherein at least a portion of said annular body comprises a material which is different from the material used in the rest of said annular body.

4. The tubeless tire insert of claim 1, wherein said coupling enables a pressure to be increased within an internal fluid chamber of said tubeless vehicle tire such that said first bead and said second bead are seated against sidewalls of said rim bed.

5. The tubeless tire insert of claim 1, wherein once said first bead and said second bead are mounted between a first sidewall and a second sidewall of said rim bed at respective initial installed positions, an inner surface of each of said first sidewall and said second sidewall and said rim bed define an internal fluid chamber which allows for selective inflation/deflation of said internal fluid chamber.

6. The tubeless tire insert of claim 1, wherein an internal fluid chamber is configured to be fluidically coupled with a valve which is capable of extending through said rim when said tubeless vehicle tire is installed on said rim, said valve adapted to be engaged with an air pump, or other pressurized fluid source.

7. The tubeless tire insert of claim 1, wherein said annular body has at least one shock absorbing feature.

8. The tubeless tire insert of claim 1, wherein said positioning system is a shape memory actuated positioning system.

9. The tubeless tire insert of claim 8, wherein said shape memory actuated positioning system is actuated to change said mean inner diameter of said insert by applying external heating or electric resistive heating, or applying a magnetic field to said shape memory actuated positioning system.

10. The tubeless tire insert of claim 8, wherein said shape memory actuated positioning system comprises a cable or a wire or a chain or a cord or a helical structure or a sheet-like structure.

11. The tubeless tire insert of claim 8, further comprising an electrical connection configured to actuate said shape memory actuated positioning system.

12. The tubeless tire insert of claim 8, wherein said shape memory actuated positioning system comprises a standoff pneumatic positioning system having a static portion and a dynamic portion.

13. The tubeless tire insert of claim 8, wherein said shape memory actuated positioning system comprises a standoff element.

14. The tubeless tire insert of claim 8, wherein said shape memory actuated positioning system further comprises an adjusting device.

15. The tubeless tire insert of claim 8, wherein an internal fluid chamber is configured to be fluidically coupled with a valve which is capable of extending through said rim when said tubeless vehicle tire is installed on said rim, said valve adapted to be engaged with an air pump, or other pressurized fluid source, and wherein said valve has an electrical connection integrated therewith for actuating said shape memory actuated positioning system.

16. The tubeless tire insert of claim 8, wherein said shape memory actuated positioning system is a standoff element.

* * * * *